K. WOLAK.
KITCHEN UTENSIL.
APPLICATION FILED MAY 4, 1920.

1,363,632.

Patented Dec. 28, 1920.

Inventor
K. Wolak

By N. M. Wilson
Attorney

UNITED STATES PATENT OFFICE.

KORNELIA WOLAK, OF PASSAIC, NEW JERSEY.

KITCHEN UTENSIL.

1,363,632.  Specification of Letters Patent.  Patented Dec. 28, 1920.

Application filed May 4, 1920. Serial No. 378,735.

*To all whom it may concern:*

Be it known that I, KORNELIA WOLAK, a citizen of Poland, residing at Passaic, in the county of Passaic and State of New Jersey, have invented certain new and useful Improvements in Kitchen Utensils, of which the following is a specification.

The primary object of the invention is the provision of means for resiliently maintaining the closure of a utensil in its operative position while the utensil may be lifted and carried without danger of burning the hands.

A further object of the invention is to provide an attachment for kettles and the like whereby the same may be readily carried either with one or both hands while a cover is resiliently maintained in closed position upon the kettle.

A still further object of the invention is to provide a lid holder and carrying handle for a kettle that is easily and quickly detached when desired and in no manner interferes with the usual operation of the utensil, the structure possessing great strength and being easy and inexpensive to manufacture.

With these general objects in view, the invention consists of the novel combination hereinafter fully described in connection with the accompanying drawing and in which like reference characters designate corresponding parts throughout the several views.

Figure 1:
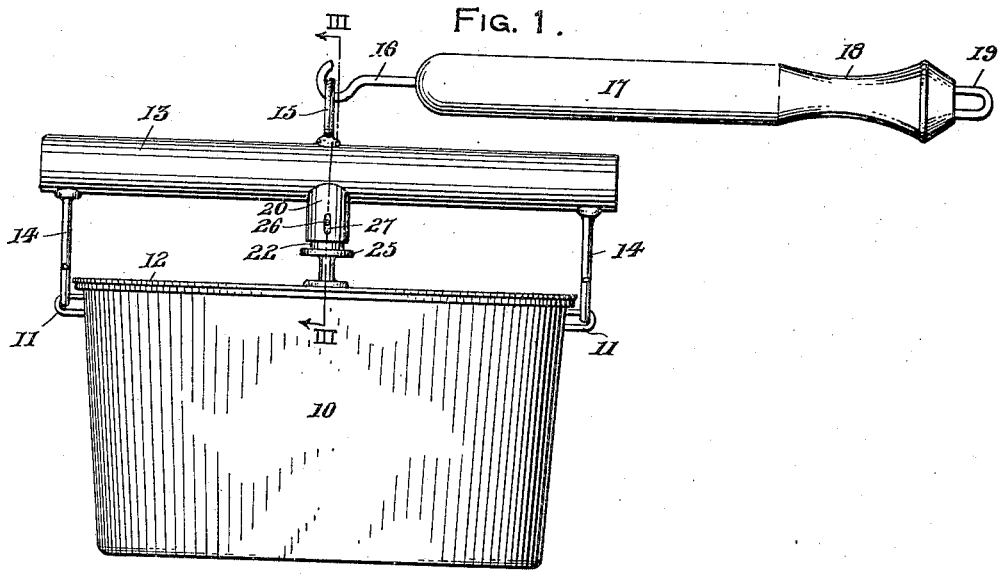
Figure 1 is a side elevation of a kettle provided with my invention.
Figure 2:
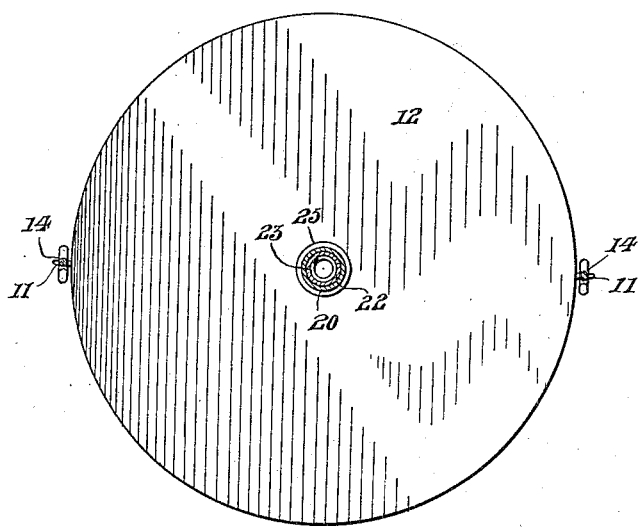
Fig. 2 is a transverse horizontal sectional view thereof.
Figure 3:
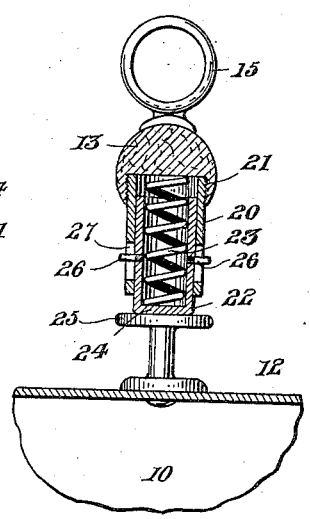
Fig. 3 is a vertical detail sectional view taken upon line III—III of Fig. 1.
Figure 4:
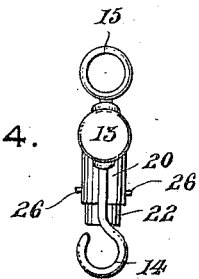
Fig. 4 is an end elevation of the device with the lifter removed.

My invention is serviceable in resiliently retaining the lid upon any form of utensil as well as for easily carrying the utensil and is herein illustrated in connection with a kettle 10 having attaching loops 11 at diametrically opposite sides thereof and a flat closure lid 12 for the open top of the kettle. A cylindrical handle 13 formed of wood has depending hooks 14 adjacent its opposite ends for engaging within the loops 11 while a centrally positioned ring 15 upon the upper side of the handle 13 is adapted for receiving the hooked end 16 of a lifter 17. The lifter is readily detachable from the ring 15 and has a contracted handle portion 18 for grasping in lifting the kettle 10 by a person positioned at one side thereof so that there is little danger of being injured or inconvenienced by steam arising from the kettle. A loop 19 at the handle end of the lifter 17 is provided for convenience in hanging up the lifter.

A centrally depending sleeve 20 threaded into a recess 21 of the wooden handle 13 has a cup-shaped foot 22 slidable therein while a spring 23 is tensioned between the bottom 24 of said foot and the handle 13 normally holds the foot depressed. When the device is positioned upon a kettle, the foot 22 is seated upon the central knob 25 of the lid 12 and by means of the spring 23 resiliently retains the lid 12 in its closed position upon the kettle 10. Outwardly projecting pins 26 carried by the foot 22 project within opposite slots 27 of the sleeve 20 whereby the foot 22 is prevented from accidental removal from the sleeve 20.

The complete operation of the invention will be fully understood, the hooks 14 being readily engaged in the loops 11 and the foot 22 readily mounted upon the knob 25 by depressing said foot either by engaging the bottom 24 thereof or the said pins 26. The handle 13 may then be grasped with either one or both hands for lifting the kettle 10 while the lid 12 is retained in its closed position. The force of the spring 23 is also sufficient to maintain the handle 13 horizontally above the lid 12, while the lifter 17 may be employed as an auxiliary handle when the occasion requires..

A serviceable attachment for cooking utensils is provided and while the form of the invention herein set forth is believed preferable, it will be understood that minor changes may be made therein without departing from the spirit and scope of the invention.

What is claimed as new is:

1. In combination with a kettle having a lid, a handle adapted for transverse positioning above said lid, depending hooks adjacent the opposite ends of the handle adapted for engaging the loops of the kettle, and an extensible foot carried by the handle adapted for seating upon the lid of the kettle whereby the lid is maintained in closed position and the handle in its operative position above the lid.

2. In combination with a kettle having a lid, a handle adapted for transverse positioning above said lid, depending hooks adjacent the opposite ends of the handle adapted for engaging the loops of the kettle, a centrally depending extensible member carried by the handle adapted for seating upon the lid, resilient positioning means for the extensible member, movement limiting means for the latter and a ring upon the handle opposite the extensible member.

3. In combination with a kettle having opposite loops and a lid having a central knob, a wooden handle positionable above the lid, depending hooks adjacent the ends of the handle adapted for reception through said loops when the device is in its operative position, a depending sleeve carried by the handle, a spring pressed foot extensible within said sleeve adapted for seating upon the knob with the handle positioned for grasping transversely above the knob.

4. In combination with a kettle having opposite loops and a lid having a central knob, a wooden handle positionable above the lid, depending hooks adjacent the ends of the handle adapted for reception through said loops when the device is in its operative position, a depending sleeve carried by the handle, a spring pressed foot extensible within said sleeve adapted for seating upon the knob with the handle positioned for grasping transversely above the knob, outwardly projecting limiting pins for the foot adapted for grasping and retracting the foot and a lifter receiving ring centrally mounted upon the handle.

5. A device of the class described comprising an elongated handle, hooks depending from one side thereof adjacent the ends of the handle, a sleeve depending from and having threaded engagement with the handle centrally between said hooks and provided with opposite longitudinal slots, a cup-shaped foot slidably mounted within said sleeve with its closed end outwardly of the sleeve, movement limiting pins upon opposite sides of the foot projecting through said slots adapted for grasping outwardly of the sleeve and an extensible spring within the foot tensioned between the bottom of the foot and the adjacent portion of the handle.

In testimony whereof I affix my signature.

KORNELIA WOLAK.